United States Patent
Savoire et al.

(10) Patent No.: US 8,969,777 B2
(45) Date of Patent: Mar. 3, 2015

(54) METHOD FOR PROCESSING IMAGES USING OBJECT SIGNALS TO ESTIMATE TRANSFER FUNCTIONS OF OPTICAL FIBERS

(75) Inventors: Nicolas Savoire, Mouans-Sartoux (FR); Tom Vercauteren, Paris (FR)

(73) Assignee: Mauna Kea Technologies, Paris (FR)

( * ) Notice: Subject to any disclaimer, the term of this patent is extended or adjusted under 35 U.S.C. 154(b) by 0 days.

(21) Appl. No.: 14/117,997

(22) PCT Filed: May 16, 2012

(86) PCT No.: PCT/IB2012/001313
§ 371 (c)(1),
(2), (4) Date: Jan. 15, 2014

(87) PCT Pub. No.: WO2012/156826
PCT Pub. Date: Nov. 22, 2012

(65) Prior Publication Data
US 2014/0117207 A1    May 1, 2014

Related U.S. Application Data

(60) Provisional application No. 61/486,551, filed on May 16, 2011.

(51) Int. Cl.
*H01L 27/00* (2006.01)
*G06T 5/20* (2006.01)
(Continued)

(52) U.S. Cl.
CPC ............... *G06T 5/20* (2013.01); *G02B 21/365* (2013.01); *G06T 5/008* (2013.01); *G06T 5/006* (2013.01); *G06T 2207/10056* (2013.01)
USPC .................................... 250/208.1; 250/227.2

(58) Field of Classification Search
USPC ................. 250/208.1, 201.3, 227.2, 559.4; 382/193, 194, 135, 144–147, 175; 702/19, 127
See application file for complete search history.

(56) References Cited

U.S. PATENT DOCUMENTS

| 5,878,159 A | 3/1999 | Taleblou et al. |
| 6,587,189 B1 | 7/2003 | Roberts et al. |

(Continued)

FOREIGN PATENT DOCUMENTS

| WO | 91/06881 A1 | 5/1991 |
| WO | 2010/076662 A2 | 7/2010 |

OTHER PUBLICATIONS

Tsai et al., "Multi-Fibre Calibration of Incoherent Optical Fibre Bundles for Image Transmission," Transactions of the Institute of Measurement and Control, London, Great Britain, vol. 15, No. 5, Jan. 1, 1993, pp. 260-268.

(Continued)

*Primary Examiner* — Que T Le
(74) *Attorney, Agent, or Firm* — Osha Liang LLP

(57) ABSTRACT

A method for processing images acquired by image detectors with non-uniform transfer functions and irregular spatial locations includes the steps of accumulating data from multiple images, defining an affinity graph which edges define pairs of detectors that measure related signal, performing statistical analysis on the accumulated data with respect to each pair of detectors, and solving a system of equations constructed from the results of the statistical analysis to estimate each detector transfer function, a set of solutions to the system of equations comprising a calibration of an imaging system.

17 Claims, 3 Drawing Sheets

(51) Int. Cl.
    *G02B 21/36* (2006.01)
    *G06T 5/00* (2006.01)

(56) References Cited

U.S. PATENT DOCUMENTS

| | | | |
|---|---|---|---|
| 7,869,679 | B2 | 1/2011 | Viellerobe et al. |
| 7,903,848 | B2 | 3/2011 | Perchant et al. |
| 8,364,414 | B2 * | 1/2013 | Masumura .................. 702/19 |
| 2009/0092363 | A1 | 4/2009 | Daum et al. |
| 2009/0237498 | A1 | 9/2009 | Modell et al. |

OTHER PUBLICATIONS

Fernandez et al., "Location of Optical Fibers for the Calibration of Incoherent Optical Fiber Bundles for Image Transmission," IEEE Transactions on Instrumentation and Measurement, Piscataway, NJ, United States, vol. 58, No. 9, Sep. 2009, pp. 2996-3003.

Demuynck, "Image Transmission through Incoherent Optical Fiber Bundle: Methods for Optimization and Image Quality Improvement," WSEAS Transactions on Signal Processing, Issue 9, vol. 4, Sep. 2008, pp. 531-541.

Demuynck, "Non-homogenous Illumination Correction of Calibrated Incoherent Optical-Fiber-Bundles for Image Transmission Purposes," MECHATRONICS, 2006 IEEE International Conference on, IEEE, PI, Jul. 2006, pp. 150-153.

Lazaro et al., "Sensor Calibration Based on Incoherent Optical Fibers Bundles (IOFB) Used for Remote Image Transmission," Sensors, vol. 9, No. 10, Oct. 19, 2009, pp. 8215-8229.

International Search Report issued in PCT/IB2012/001313 mailed on Nov. 5, 2012 (4 pages).

Written Opinion of the International Searching Authority issued in PCT/IB2012/001313 mailed on Nov. 5, 2012 (7 pages).

International Preliminary Report on Patentability from PCT/IB2012/001313 issued on Jun. 7, 2013 (34 pages).

\* cited by examiner

METHOD FOR PROCESSING IMAGES USING OBJECT SIGNALS TO ESTIMATE TRANSFER FUNCTIONS OF OPTICAL FIBERS

FIELD OF THE INVENTION

The present invention relates generally to a method for processing images acquired by means of image detectors with non-uniform transfer functions and irregular spatial locations and in particular by means of an image guide consisting of a plurality of optical fibers.

BACKGROUND

While performing laser scanning imaging through an optical fiber bundle, the raw output is a collection of samples of the signal directly observed by the detector during the scanning.

As described in U.S. Pat. No. 7,903,848, a raw image can first be reconstructed from this raw output. In this raw image, several pixels can be associated with each given fiber. Each of those pixels associated with a given fiber provide a different measurement of the signal returned by the same spatial volume of the tissue, facing the fiber at its distal end. This returned signal can either arise from fluorescence, back-scattering, or any other radiation resulting from the interaction between the incident~light and the tissue.

Those various measurements differ because the exact amount of excitation light injected in the fiber during scanning actually depends on the spatial position of the laser spot with respect to the fiber. Furthermore, if the laser spot overlaps with several fibers, the corresponding measurement may compound the returned signal collected by these fibers. From the raw data values, an estimate of the returned signal possibly associated with the spatial volume facing the fiber can typically be made by a somehow ad hoc method as in U.S. Pat. No. 5,878,159 or with a rigorous statistical model as in U.S. Pat. No. 7,903,848. This resulting estimate is then the measurement that one can associate with the given fiber.

This being done, each fiber can conceptually be seen as acting as a single detector, or CCD pixel. But this imaginary CCD differs from common CCD's, at least for four reasons:
  a. The fiber bundle is not made of regularly spaced fibers. This imaginary CCD is not square grid;
  b. The amount of light injected, transmitted and then collected is also specific to each fiber partly because fiber diameters are not all the same and proximal system optics have aberrations. As a consequence, the pixels of this imaginary CCD usually have, at least, different sensitivities;
  c. Some optical scattering effects (Rayleigh, Fresnel, Raman, etc.) may occur at the interfaces or within the fibers, and some signal, either linear or non-linear, may also appear because of it. For those reasons, the returned signal collected from a fiber is not null even if there is no object signal directly produced by the tissue. Also, this background value is different for each fiber; and
  d. In addition, those above three phenomena may vary with time. For example, in the context of fluorescence imaging, if the fibers present some auto-fluorescence, its intensity will generally decrease due to photo-bleaching.

To summarize, after the raw-pixel-to fiber association, each fiber can be seen as a mono-pixel detector with a specific transfer function (e.g. specific offset and specific gain or sensitivity). The imaging system is thus irregular in that the transfer functions are time-varying and non-uniform, i.e. pixel-dependent, and in that the pixels are irregularly located in the spatial domain. In the sequel, for clarity purposes, we refer to these conceptual detectors as fibers, but it should be clear that the discussion need not be restricted to actual physical fibers.

U.S. Pat. Nos. 7,903,848 and 5,878,159 propose different means of processing data coming from detectors with non-uniform fiber transfer functions. U.S. Pat. No. 5,878,159 only discloses an invention in which the fiber transfer functions are simple linear functions (the returned fiber signal is modeled as the multiplication of the object signal by a fiber-dependent gain constant). It does therefore not address the case in which the background signal may not be null when the object signal is null. U.S. Pat. No. 7,903,848 discloses an image processing method that compensates for affine fiber transfer functions. This may be achieved by acquiring two images, one in an homogeneous background medium (e.g. air or water) and one in an homogeneous medium having a strong object signal (e.g. fluorescent solution in case of a fluorescent microscope). The affine fiber transfer functions (i.e. the offsets and gains) are then deduced from these two images. It should be noted that, even though, for clarity purposes, we refer to these reference images as being acquired in homogeneous media, in other contexts, they may simply correspond to homogeneous object signal (e.g. flat field images).

Fiber-based imaging systems are, for example, commonly used to perform endomicroscopy, i.e. endoscopy at a microscopic level. In such a clinical context, acquiring the two images required by U.S. Pat. No. 7,903,848 before each use of the imaging system, i.e. each endomicroscopic procedure, is problematic. Indeed, putting the distal end of the fiber bundle into a homogeneous medium might both, compromise the cleanliness or asepsis of the fiber that may come in contact with the patient, and, burden the procedure for the physician. It should also be clear that in other use cases, finding the proper homogeneous medium might not be trivial. To address this problem but still be able to compensate for affine fiber transfer functions, PCT Pat. Application No. PCTIB2009008012 disclose an invention in which only the background image is acquired, typically in the air, prior to the procedure. This background image is then automatically mapped to data (e.g. background and strong object signal images) that has been acquired previous to the procedure (e.g. during manufacturing) and that is stored together with the imaging system (e.g. on a control computer). From the on-site background image and the mapped previous data, PCT Pat. Application No. PCTIB2009008012 deduces the gains and offsets of the affine fiber transfer functions. The imaging system typically comprises a perduring unit (e.g. laser scanning) and a disposable accessory (e.g. fiber bundle). In the approach of PCT Pat. Application No. PCTIB2009008012, typically only the disposable accessory will be available during manufacturing to acquire the data needed for the on-site image processing, while the perduring unit will remain at the end-user site. Also, it should be apparent that any data acquired during manufacturing will remain constant over time even though the characteristics of the imaging system may vary on the long-term, for example due to aging or environmental characteristics. Hence, the data can only be a biased approximation of what would have been acquired with the complete final imaging system at the time of the image acquisition. This will result in a biased approximation of the fiber transfer functions and thus will lead to a sub-optimal image quality. Also, this solution requires that the disposable accessory be sent to the end-user with the data that corresponds to it. The data needs to be accessed by the image processing method and this will typically require a burdensome installation procedure prior to the first use of the disposable accessory.

Besides the already listed defects of these previous approaches, they all share other common shortcomings. Because the reference images (background and strong object signal) are typically not acquired on a medium having the exact same physical properties (e.g. numerical aperture) as the final object of interest (whose properties are often unknown), the estimated fiber transfer functions will, in any case, only be biased approximations of the fiber transfer functions seen on the object. In other words, these fiber transfer functions typically not only depend on the perduring unit and disposable accessory but depend on the complete imaging setup, imaged medium included.

Furthermore, none of these previous approaches can cope with time-varying fiber transfer functions. As mentioned previously, such scenario is however at least typical in case of fibers that show an auto-fluorescence background signal. Offset values due to fibers auto-fluorescence typically decrease with time, and in a different amount from one fiber to the other, which makes any offset measurement performed before use poorly relevant. Not only does it not reflect the average background level observed in real time during the procedure, but the difference in variation of this background from one fiber to the other affects the image quality and eventually appears as a veil on the image, i.e. a static pattern. Proper pre-illumination of the fibers right before the use of the imaging system may lead to stabilization of the auto-fluorescence and may thus be considered as a potential solution. However this imposes strong constraints to the end-user and does not generalize to other time-varying physical phenomena.

Prior art shows that the problem of non-uniform image detectors arises in other fields and that it has been addressed with different methods as shown for example in Weiss ICCV 2001 or Kuhn et al. Astronomical Society of the Pacific 1991. Accordingly, a need exists for a system and method that would allow for the processing of the data provided by such detectors.

SUMMARY

The object of the proposed invention is to propose a new way to compensate for these non-uniform, time-varying fiber transfer functions such as to obtain a uniform image when observing a uniform medium. The estimation the fiber transfer functions for their compensation will be referred to as the calibration of the imaging system. We disclose a method ensuring a continuous and real-time optimization of the calibration computed directly from the object images acquired by the imaging system during use. Our invention does therefore not necessarily require prior calibration data to be acquired either on site with a burdensome procedure for the user or during a manufacturing step with a potentially complex transmission of the data to the user.

The above and other objects, features, operational effects and merits of the invention will become apparent from the following description and the accompanying drawings.

BRIEF DESCRIPTION OF DRAWINGS

Hereafter, the invention is described more particularly by way of a preferred embodiment with reference to the drawings.

DETAILED DESCRIPTION

Figure 1:
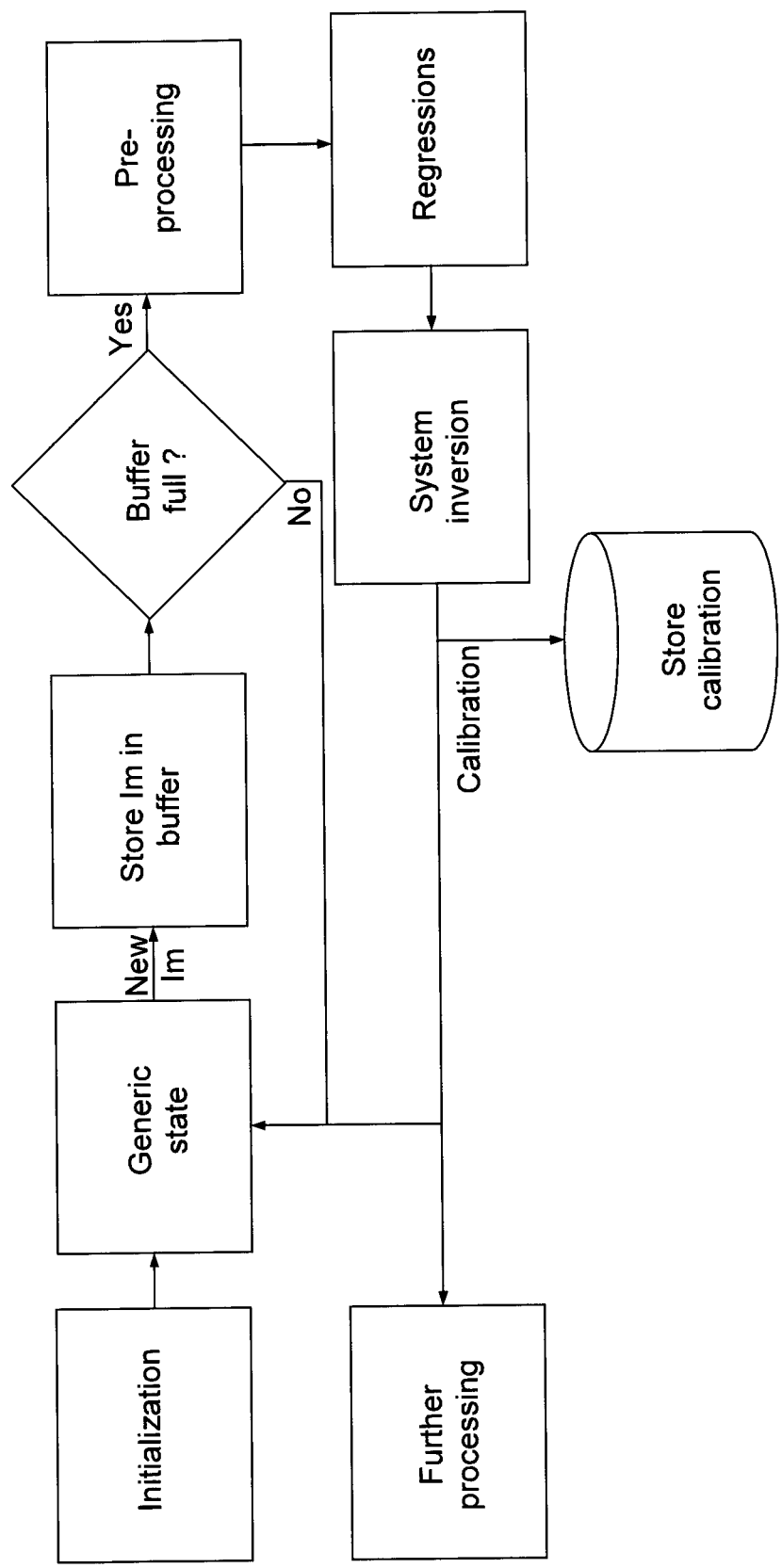
FIG. 1 is an example state diagram representing, at a high-level, the major components of a system in accordance with the present invention.

In general, embodiments of the invention provide a method that can cope with fiber transfer functions that are more complex than a simple gain factor, with the time-varying aspect of the fiber transfer function, and with the irregular spatial arrangement of the detectors.

Blind Calibration Overview

Embodiments of the invention allow for finding an optimal calibration of the imaging system based on the input object signal it receives. Such a calibration might be referred to as blind in the sense that it does not necessarily rely on specific prior calibration data.

The root observation behind the present invention is that, when looking at physical objects, neighbor fibers nearly see the same object signal over time. This property arises from the mostly continuous nature of the images. This has been thoroughly studied for natural images and holds for almost all images of physical objects. Given the fact that fiber transfer functions are typically either constant in time or slowly varying in comparison to object signal variation, the observed returned signals from neighbor fibers will be strongly temporally correlated. Given a model of the fiber transfer functions, one can deduce a model of the relationship functions between neighbor fibers. Each new frame provides one sample measurement for each relationship function of each set of neighbor fibers. By accumulating a sufficient amount of these measurements on object of interest, our invention computes a good estimation of these relationship functions. As will be made clearer afterward, this relationship functions estimation step may also be referred to as the regression step. By inverting the complete system of relationship functions, the present invention provides an adapted estimation of the fiber transfer functions. An alternative, more computationally demanding option may also be used. For example, instead of a two-step, regression-inversion, procedure, it might be advantageous in some cases to construct a single cost function, based on the discrepancy between the measurements and the transfer functions of linked fibers. This cost function may then be optimized with respect to the fiber transfer functions.

The principle of our invention is not restricted to direct spatial neighbors but may work as long as one defines an affinity graph linking the fibers that are known to statistically see highly correlated object signal. In some embodiments of the invention where affinity may be related to spatial neighborhood, this graph may typically be constructed from a Delaunay triangulation of the fiber positions which is an intuitive means of defining spatial neighborhood. Furthermore, the object and returned signal need not be restricted to scalar values but may very well be vector-valued as in the imaging system disclosed in U.S. Pat. No. 7,869,679.

Blind Calibration General Mathematical Derivation

Let $p_i$ the spatial position of fiber i relative to the spatial position of an arbitrary fiber, e.g. the first one;

Let $v_i(t)$ be the returned signal measured by the fiber i at time t. $v_i(t)$ may be scalar or vector-valued;

Let $u_i(t)$ be the object signal seen by the fiber i at time t. $u_i(t)$ may be scalar or vector-valued;

Let $\psi_i(.)$ be the transfer function of fiber i. As fiber transfer functions are assumed to constant or vary slowly in time in comparison to object signal, for simplicity purposes, we do not index them by time;

Let E be the edges of the fibers affinity graph.

Given these notations we have, up to imaging noise:

$$v_i(t) \approx \psi_i(u_i(t)) \quad (1)$$

With the assumption that for any pair $(i,j) \in E$ of fibers forming an edge of the affinity graph, the object signal seen by the two fibers is highly correlated and only differs by a noise term which may only be large on a sparse set of edges we have:

$$u_i(t) \approx u_j(t) \quad (2)$$

$$\psi_i(u_i(t)) \approx \psi_i(u_j(t)) \quad (3)$$

$$v_i(t) \approx \psi_i(\psi_j^{-1}(v_j(t))) = \psi_i \circ \psi_j^{-1}(v_j(t)) \quad (4)$$

It should be apparent that the above relationship need not be restricted to cases where the object signal seen by the two related fibers only differs by a noise term but that it could also be adapted to cases where the related fibers observe noisy transformed versions of the object signal with known transformation functions.

The idea behind the present invention is to use these relations to estimate the fiber transfer function. Given a sufficient variation of object signal $u_i(t)$ (and thus also, by assumption, of $u_j(t)$), there will be large variations of $v_i(t)$ and $v_j(t)$. From this returned signal, our invention proposes to estimate the composed transfer functions $\psi_i \circ \psi_j$ for each related pair of fibers in the affinity graph. The results of this regression step leads to an overdetermined system of equations which can be inverted, or solved, to get an estimation of all individual fiber transfer functions.

Time-Varying Adaptive Calibration Overview

Even though each blind calibration relies on the assumption that the fiber transfer functions are constant in time, our invention can be used to estimate time-varying fiber transfer functions by working on temporal windows on which the assumption holds. In a preferred embodiment of the disclosure, the method will accumulate the observed return signal in a buffer whose maximum size is chosen in accordance to the above assumption. A blind calibration procedure may be launched as soon as the buffer contains sufficient information.

An example overview of how the invention may handle such time-varying calibration with temporal windows is illustrated in FIG. 1.

The estimation of the relationship functions from neighboring fiber returned signals requires a certain amount of samples with a broad enough range of values to obtain an accurate estimation. For example, if the fiber bundle distal end stays in the air, only noise and background signal is collected by the fibers and no regression is possible. In the same way, if the fibers observe a constant motion-less object, regression will typically not be possible. The object signal collected by the fibers needs to vary over time. In a typical imaging context, the motion of the fibers with respect to the imaged object will generate the broad range of signal observed by the fibers. In other embodiments, the object signal variations may come from variations of the object itself as will be the case if the object is subject to photo-bleaching. Another embodiment might comprise active variations of the signal, meaning that the variations might arise from intentional actions such as illumination modulation or imposed bundle-to-object motions.

The larger the temporal window, the more accurate the regressions and thus the calibrations will be. However, it might also be advantageous to get a quick estimate in some cases. For example, if the initial calibration (the one used before the first blind calibration may be launched) is based on rough prior knowledge, having a quick first estimate that will be refined afterward, will be of much interest for the user. By adapting its criterion on the temporal window, the present invention may be used to achieve that result.

Initialization

The calibration may be initialized in many different ways. One of the most obvious options would be to rely on prior art to perform the initialization. For example, one can rely on a background image to be acquired at imaging system start-up. This alone may already provide a usable first estimate of some parameters of the fiber transfer functions while the other parameters may be set according to a potentially uninformative prior. Another complementary option is to use data that has been precomputed during manufacturing as disclosed in PCT Pat. Application. No. PCTIB2009008012.

Another option, which can be combined with the previous ones, relies on saving the calibrations once they have been estimated. During the imaging system startup, the method may fetch a saved calibration, if it exists from a previous use of the imaging system.

The imaging system will however typically not be in the exact same configuration between two different uses. For example, if the imaging system comprises a perduring unit and a disposable accessory that need to be unplugged (for example, for cleaning purposes), the replugging between uses will potentially change the appearance of the fibers on the raw image. This makes saving and reloading the calibration a non-trivial operation. Advantageously, saving a calibration may be performed with the help of the acquisition of a reference image, e.g. in the air or background, the first time the imaging system is calibrated. This may, for example, be done jointly with the acquisition of the background image for the very first initialization of the imaging system. This reference image may be used to identify the fibers whose transfer functions are saved. The image as well as the position of the fibers can be stored on a disk. Once a calibration estimation is available the estimated fiber transfer functions can be stored along with the reference image. At the next imaging system calibration, the reference image may be mapped with the background image and the previously stored fiber transfer functions may be used as initialization.

As mentioned above, these approaches can be combined in various manners. For example some parts of the fiber transfer functions may come from the saved calibration while other might come from alternative approaches such as but not limited to those presented in the prior art. One may also use an image acquired during manufacturing to serve as the reference image for the saving.

Stabilizing Blind Calibration

As should be apparent from the previous description, solving for a new blind calibration implies a large amount of regressions and the resolution of a large inverse system of equations. It is well known that such problems might not be simple to solve due to numerical errors and instabilities. We now provide some means, beyond the standard ones, of stabilizing the computations that are particularly fit for use in given embodiments of the present invention. It should be noted that some of the proposed techniques need not be restricted to the case of time-varying fiber transfer functions but may also be useful for the simpler case of fiber transfer functions that are constant in time.

Standard regression techniques typically rely on a Gaussian model of the noise. In our case, the noise in the measurement of the fiber relationship functions has no reason to be normally distributed and is more likely to be long tailed, with large values typically corresponding to strong edges in the acquired image. These large values act as outliers in the regression, and can strongly skew the regression results. Secondly, classical regressions are asymmetric. They suppose that the explanatory variable is error free which is typically not the case in our scenario. To circumvent the above shortcomings, our invention may be used in conjunction with robust orthogonal regression methods including but not limited to M-estimators, least trimmed squares and the like. Furthermore, our invention may also benefit from using an accurate statistical model of the noise to perform an adapted regression. This could for example be done with maximum likelihood estimators.

In a typical setting, it might also be useful to apply some pre-processing on the measurement of the fiber relationship functions prior to performing the regression. For example, when the method estimates that there is sufficient data to perform a blind calibration, it might be advantageous to remove the data corresponding to saturated fibers and filter the data so as to get a relatively uniform coverage of the dynamic range. The goal of this step is to avoid having too many similar values for the regressions. This may indeed, in some cases, skew the regressions, and robust statistics. For example, a median estimator cannot handle the case when more than half of the total number of samples represent background. The opposite issue may exist, if they are very few background frames, the regressions could be inaccurate. To alleviate this issue, virtual background frames could be added. More generally, samples may be weighted in order to better equalize the corresponding histograms.

Still referring to the regression problem and to the construction of the system to be solved, other practical problems may appear. Once the regressions are computed, some regression results may have a higher confidence than others. As such it might be of interest to account for these confidences for example by weighting the corresponding equations in the inverse system to be solved. For that purpose, standard measure of goodness of fit such as the r-squared coefficient or any other goodness of fit measure better adapted to the noise model may be used.

Furthermore, it may also happen that some fibers in the fiber bundle are dead, they almost do not transmit any light. The regressions computed between those fibers and their neighbors will likely be wrong. In this case, it might be desirable to detect and reject the corresponding regressions. This may for example be done by fixing a threshold on the confidence measure (e.g. goodness of fit). If the confidence is below the threshold, the corresponding regression may be used with a zero weight in the inverse system. If too many relations are removed, the rank of the system may decrease. In a typical mode of operation, this rank will be related to the number of connected components in the affinity graph linking the fibers. The solution for each component is independent from the others since there are no relations between them. If several connected components exist, several options are available to compute the final calibration. In some embodiments of the invention, all connected components can be solved independently. In other embodiments, we may choose to only solve for the fiber transfer functions of the biggest connected component and propagate the results to the remaining fibers. In still other embodiments, the independent per-component solutions may be fused for example by imposing some smoothness constraints.

In some embodiments of the present invention, we might have access to prior information about either the relationship functions between neighbor fibers or the fiber transfer functions. This information might be used to regularize the regressions computations or the system inversion.

For example, if an initial background image is acquired prior to the imaging system use and if the background signal is assumed to remain constant in time, one could compensate for the background signal in the returned signal and thus work on simplified fiber transfer functions. Another example would be the case where, again, an initial background image is acquired but one would have a model of the temporal evolution of the background signal (e.g. auto-fluorescence decrease). This temporal evolution law could be introduced in both the regression and the system inversion. Advantages of these embodiments will be made clearer in the sequel when being worked out on a practical example.

When used in time-varying mode, some embodiments of the present invention might also benefit from introducing a temporal smoothness or consistency on the estimated calibrations. This might for example be done by introducing the previous calibration result as a regularization term in the system to be solved. Other options include but are not limited to simply scaling the calibrations so that consecutive calibrations match in terms of final brightness of the estimated object signal.

Interaction with Other Potential Image Processing Components

In many imaging systems, in addition to the fiber transfer functions, there might exist an adjustable global system transfer function that may be tuned according to the input data. A typical scenario would be the adjustment of the detection chain gain or a fluctuation in the excitation laser light. Such adjustments are often made to avoid the detectors' saturation and keep the signal in an optimal dynamic range for the electronics. With minor adaptations, our invention can handle these cases. Let $y_t(.)$ be the (known) adjustable global system transfer function, the returned signal measured by the fiber i at time t now becomes:

$$v_i(t) = Y_r(\psi_i(\mu(t)))$$

Transforming the samples into $\tilde{v}_i(t) = Y_r^{-1}(v_i(t))$, the same calibration process can be applied to $\tilde{v}_i(t)$.

Besides such known global changes to the imaging system, it may also happen that during use, automatic controls may be run to check and potentially correct for any drift of the imaging system configuration. For example, if the imaging system comprises a perduring unit and a disposable accessory that needs to be plugged together, the overall configuration may be very sensitive to the connection. Any shift in the connector will result in a configuration change that may impact the raw pixel to fiber association and render the fiber transfer functions obsolete. Remapping the current raw image to the reference image will solve the raw pixel to fiber association problem but the previous fiber transfer functions might still become obsolete. In other cases, it might also be that the configuration drift is detected by the system and potentially compensated for without any lasting impact on the fiber transfer functions. The present invention can be adapted to any of these permanent or temporary imaging system configuration changes. In the case of a permanent change, it might be advantageous to ask for a new blind calibration to be performed as soon as sufficient new returned signal is accumulated. In the case of a temporary change, it might be advantageous to simply stop accumulating returned signal until the system is known to be back to its previous configuration.

Off-Line and Lagged-Time Modes

Parts of the calibration system described in previously were especially suited for on-line operating mode. However with minor modifications the calibration algorithm could be applied as a post-processing to already acquired sequences or with some delay or a currently acquired sequence.

If the fiber transfer functions are almost constant in time, in off-line mode, there is potentially no need for a history buffer and potentially no need for deciding when to launch the estimation, since the whole sequence can be used to compute the new calibration.

The calibration estimated from one long sequence could also be applied to a short sequence acquired shortly after or before, for which an estimation would not have been possible because of not enough data.

In another embodiment of the off-line mode, several sequences may be combined to obtain a better calibration estimation, and the calibration applied to all the input sequences.

Furthermore, in offline or lagged-time mode, a temporal window may still be used but need not be closed by the current frame. It might for example be advantageous to choose a temporal window centered on the current frame.

EXAMPLE IMPLEMENTATION DETAILS FOR AFFINE FIBER TRANSFER FUNCTIONS

In the sequel, we derive the full model for the case of affine fiber transfer function. An affine fiber transfer function may be fully characterized by an offset and a gain. We will thus focus on the estimation of these two parameters per fiber. For sake of clarity, we focus on existing fiber-based microscopic imaging techniques including fluorescence imaging, Second Harmonic Generation (SHG) and Coherent Antistokes Raman Scattering (CARS), even though the case of affine fiber transfer functions is not restricted to these specific types of imaging.

Given an affine model for fiber transfer functions and using fibers per pair (the edges of the affinity graph), we get affine composed transfer functions $\psi_i \circ \psi_j$. The coefficients of these affine functions linking the temporal returned signals of pairs of neighbor fibers are the correction coefficients to calibrate one fiber relatively to the other. They may conceptually be seen as the gradient of the offset and gain maps even though this notion is ill defined oh irregular grids such as ours. Computing the calibration of the system is thus conceptually close from recovering offsets and gains from their gradient.

Fluorescence Imaging Model

In the typical case of fluorescence imaging through fibers, the intensity collected by the detector comes for a first part from a background signal generated in the fibers themselves (due to auto-fluorescence effects, Raman scattering and the like), and for the other part from a fluorescence generated by the observed tissue.

In classical fluorescence (a.k.a. one photon fluorescence), both intensities are proportional to the intensity of the light source, and to different extents, to the transmission of individual fibers (at the excitation wavelength and at the fluorescence wavelengths) as well as coupling efficiencies with the fibers. But while the background depends only on the fiber properties, the tissue signal depends on, and is proportional to, the concentration of fluorescent molecules inside the tissue.

The collected signal can thus be synthesized as a sum of:
a. a variable value, proportional to the concentration of fluorescent molecules, the coefficient being only fiber dependent, and
b. a constant value, which is only fiber dependent In more details, the Beer-Lambert law teaches that the fluorescence intensity is also proportional to some absorption and emission coefficients, which are specific to the fluorescent molecules. In this context, we cannot separate them from the concentration itself. In the following, the term concentration must be understood as an effective concentration, i.e. the product of the actual concentration by the absorption and emission coefficients.

From the above discussion, we can see that the fluorescence imaging model is indeed an instantiation of an affine imaging model.

Other types of fluorescence exist, such as two photons excitation. In this case, the signal is not proportional anymore to the intensity of the light source, but to its square. Consequently, the dependence on the coupling efficiencies in the fibers and on their transmission at the excitation wavelength is also raised to the power 2. However the dependence on the concentration of fluorescent molecules in the tissue remains the same, i.e. linear, due to the incoherent summation of the contributions of individual molecules.

It should therefore be apparent that, in this two photons situation also, the fluorescence imaging model remains an instantiation of an affine imaging model, but with coefficients which are of course different from the ones used for classical fluorescence.

Other Microscopic Imaging Model

This description can be generalized to even more sophisticate imaging modalities, such as Second Harmonic Generation (SHG) or Coherent Antistokes Raman Scattering (CARS). This time, the contribution of individual molecules sum up coherently, i.e. in amplitude, making the resulting intensity vary as the square of the concentration of molecules. But still, the signal collected by the detector is the sum of two contributions:
a. a tissue signal, proportional to the square of the concentration with some fiber-dependent multiplicative coefficient, and
b. a fiber-dependent additive background signal From this discussion, we note we are still faced with an instantiation of an affine imaging model, provided that, instead of working with an effective concentration, we now work with the square of this quantity.

In the following sections, we will not distinguish between the various imaging models presented above, and we will always refer to a generalized concentration which can either be understood as the effective concentration itself, or as a function of it. This includes its square for the cases of Second Harmonic Generation (SHG) or Coherent Antistokes Raman Scattering (CARS). It should in any case be clear that fluorescence, SHG and CARS are only presented as common imaging models but that other types of imaging may benefit from our invention.

Mathematical Assessment of the Core Assumption

From now on, we simply call $\alpha_i$ the gain of the fiber and $\beta_i$ the offset of the fiber. Calibrating the system requires to estimate these values, in order to be able to recover the object signal.

In the previous sections, we mentioned that our invention relies on the hypothesis that neighbor fibers nearly see the same thing. In the specific case of microscopic imaging, this hypothesis naturally derives from the mostly continuous nature of the generalized concentration.

a. $p_i$ still refers the spatial position of fiber i relative to the spatial position of an arbitrary fiber, e.g. the first one;

b. Let $v_i(t)$ be the returned signal measured by the fiber i at time t. The boldface on v is dropped in this context to highlight the fact that we now focus on scalar signal;

c. Let $C(\rho)$ be the generalized concentration at position $\rho$ in the imaged object;

d. Let $\phi(t)$ be the spatial position of the fiber bundle distal end at time t with respect to the imaged object;

e. The generalized concentration in the volume imaged by the fiber i, $u_i(t)$, is thus given by $u_i(t) = C(\phi(t) + \rho_i)$ Given these notations, the affine model can be formulated as:

$$v_i(t) = \alpha_i v_i(t) + \beta_i \quad (5)$$

Let E be the set of edges of a spatial neighborhood graph. We may for example typically use an undirected graph associated with the Delaunay triangulation of fibers. Let $(i,j) \in E$, we have $$\begin{aligned} v_j(t) &= \alpha_j C(\varphi(t) + p_j) + \beta_j \\ &= \alpha_j C(\varphi(t) + p_i + p_j - p_i) + \beta_j \\ &= \alpha_j C(\varphi(t) + p_i) + (p_j - p_i) \cdot \nabla C(\varphi(t) + p_i) + \beta_j + o(\|p_j - p_i\|) \\ &= \frac{\alpha_j}{\alpha_i}(v_i(t) - \beta_i) + \beta_j + (p_j - p_i) \cdot \nabla C(p_i + \varphi(t)) + o(\|p_j - p_i\|) \end{aligned}$$

With the natural assumption that the variations of the generalized concentration are almost always smooth and that sharp variations are rare (meaning that the distribution of gradient values is sparse), the last equation can be rewritten as:

$$v_j(t) = \frac{\alpha_j}{\alpha_i}(v_i(t) - \beta_i) + \beta_j + X_t \quad (6)$$

where $X_t$ is a noise term whose distribution is sparse. One example of such distribution being the Laplacian distribution. From (6), it appears that returned signals collected by two neighboring fibers can indeed be approximately related by an affine equation and that they will thus be highly correlated.

Affine System Model

In this affine cast, the idea behind the present invention of using the fiber relationship functions to estimate the calibration translates as using these relations to estimate $\{\alpha_i\}$ and $\{\beta_i\}$. Consider the returned signals $v_i(t)$ and $v_j(t)$ observed from two neighboring fibers, the coefficients $a_{ij}$, $b_{ij}$ of the affine relation between the two returned signals can be estimated by a affine regression:

$$v_j(t) \sim a_{ij} v_i(t) + b_{ij}$$

Identifying the coefficients with those of equation (6) we get:

$$\begin{cases} a_{ij} = \dfrac{\alpha_j}{\alpha_i} \\ b_{ij} = \beta_j - \dfrac{\alpha_j}{\alpha_i}\beta_i \end{cases}$$

or in other terms:

$$\begin{cases} a_{ij}\alpha_i - \alpha_j = 0 \\ a_{ij}\beta_i - \beta_j = -b_{ij} \end{cases} \quad (7)$$

By considering all neighboring fiber couples, we obtain two linear systems, one whose unknowns are the $\alpha_i$ and one whose unknowns are the $\beta_i$. Hence this enables us to estimate a calibration from affine relationships computed from observed uncalibrated returned signal.

In the following parts, we consider only the affine relationships between neighbor fibers, and typically rely in the Delaunay triangulation to define neighborhood. We could of course also look for affine relationships between fibers that are further away, e.g., two or three edges away from each other.

Regressions: Affine Relations Estimation

Using the model (6), we want to estimate the regression coefficients a and b from two sets of observed returned signals $x_k = v_i(t_k)$ and $y_k = v_j(t_k)$ collected from two neighboring fibers i and j and sampled at times $\{t_k\}_{1 \le k \le m}$:

$$y_k = \alpha x_k + b + X_{t_k}$$

Ordinary Least Squares

The most classical method would be to use least squares regression:

$$(\hat{a}, \hat{b}) = \operatorname*{argmin}_{a,b} \sum_{k=1}^{m} (y_k - ax_k - b)^2$$

However, several drawbacks are associated with this method. First $X_i$ has no reason to be normally distributed and is more likely to be long tailed, large values corresponding to strong edges in the acquired image. As mentioned earlier, these large values may skew the least square estimation. It is also noted that least square regression is asymmetric. It supposes that the explanatory variable x is error free. A consequence is that the result of the regression $x_k = a'y_k + b'$ will not be the inverse of the regression $y_k = ax_k + b$. A noise in the explanatory, as we have here, will bias the slope estimation towards 0, which is known as the attenuation bias.

Robust Orthogonal Regression

Since we have an error-in-variables regression, i.e. measurement error in both variables, if the assumption that the variance of the error is the same for both variables is reasonable, it might be advantageous to use an orthogonal regression to estimate a and b. In an orthogonal regression, the objective function is the sum of squared distances to the regression line:

$$\hat{\theta} = \operatorname*{argmin}_{\{\theta | \theta_1^2 + \theta_2^2 = 1\}} \sum_{k=1}^{m} (\theta_1 x_k + \theta_2 y_k + \theta_3)^2$$

This approach may help fixing the attenuation bias. Also as illustrated previously, to account for the presence of outliers, our method may advantageously rely on robust regression methods. Any robust methods that have been proposed in the prior art, least median of squares, least trimmed squares, least absolute deviation, M-estimators, etc. may be used in embodiments of our invention.

Goodness of Fit

As mentioned, partly because of potential dead fibers in the fiber bundle, it might be advantageous to detect and reject regressions which are bad fits. In addition to the standard goodness of fit measures such as the r-squared coefficient, embodiments of our invention may benefit from using a robust version of r-squared such as:

$$r_{robust}^2 = \frac{\left(\sum_{k=1}^{m} w_k (x_k - \bar{x})(y_k - \bar{y})\right)^2}{\sum_{k=1}^{m} w_k (x_k - \bar{x})^2 \sum_{k=1}^{m} w_k (y_k - \bar{y})^2} \quad (8)$$

where $w_k$ are the final weights from the robust estimator, where $$\bar{x} = \frac{\sum_{k=1}^{m} w_k x_k}{\sum_{k=1}^{m} w_k} \text{ and } \bar{y} = \frac{\sum_{k=1}^{m} w_k y_k}{\sum_{k=1}^{m} w_k}.$$

Similar to r-squared, $r_{robust}^2$ belongs to $[-1,1]$.

Alternative Regressions

In the above regression methods, the structure of the noise is not taken into account. It might however be advantageous to do so. For example, if we make the hypothesis that the noise $X_i$ has a Laplacian distribution, then the maximum likelihood estimator for the regression is one that minimizes the sum of absolute differences:

$$\hat{\theta}_{ML} = \underset{\{\theta|\theta_1^2+\theta_2^2=1\}}{\operatorname{argmin}} \sum_{k=1}^{m} |\theta_1 x_k + \theta_2 y_k + \theta_3|$$

Furthermore, in the above regression methods, the noise was implicitly supposed to be homoscedastic, i.e. the variance of the noise was the same for all samples, although, partly due to the instability of the scanning, the imaging system may exhibit a multiplicative noise. As a consequence, samples with higher value may be affected by a noise with a higher variance. To account for this heteroscedastic noise, by making the hypothesis that the noise variance is proportional to the sample value, embodiments of the present invention might advantageously optimize for the relative error in the regression:

$$\hat{\theta} = \underset{\{\theta|\theta_1^2+\theta_2^2=1\}}{\operatorname{argmin}} \sum_{k=1}^{m} \left|\frac{\theta_1 x_k + \theta_2 y_k + \theta_3}{x_k + y_k}\right|$$

Linear System Solving
Gain Estimation

Once the regressions have been computed, the linear systems (7) need to be solved. Both linear systems share the same left hand side. First, consider the gain linear system:

$$\{\alpha_{ij}\alpha_i - \alpha_j = 0\}_{(i,j) \in E} \quad (9)$$

Let n be the number of fibers, and m =|E| be the number of edges in the affinity graph linking the neighbor fibers, e.g. Delaunay triangulation. In a typical setup where the fiber pattern is hexagonal, we have m≃3n. Let $E=(u_k, v_k)_{1 \leq k \leq m}$ be the edges of affinity graph. Let A be an m×n matrix such as:

$$A_{ki} = \begin{cases} -\alpha_{u_k, v_k} & \text{if } i = u_k, \\ 1 & \text{if } i = v_k, \\ 0 & \text{else.} \end{cases}$$

A is sparse, there is only two non-zero coefficients per line. The linear system (9) can be rewritten as A.α=0. Note that 0 is a trivial but non-interesting solution. If α is a non-trivial solution, then λα is also a solution. This is expected since what we measure is the relative gain between the fibers, and as such any multiplicative factor applied to the fiber gains will not change the relative gains.

Without loss of generality, we can add the constraint $\|\alpha\|=1$. The system is overdetermined, and the least squares solution $$\hat{\alpha} = \underset{\alpha|\|\alpha\|=1}{\operatorname{argmin}} \|A\alpha\|^2$$

is the eigenvector corresponding to the smallest eigenvalue of $A^T A$. The eigenvector can be computed by using sparse SVD algorithms.

Although generic sparse SVD algorithms might be used to solve the system, embodiments of the present invention might also leverage the structure of the problem. Since the gains to estimate are positive and the error on them may typically be better modeled as multiplicative, the problem can be advantageously transposed to the log domain:

$$\left\{\log \frac{\alpha_j}{\alpha_i} = \log a_{ij}\right\}_{(i,j) \in E}$$

or in other terms:

$$\{\tilde{\alpha}_j - \tilde{\alpha}_i = \tilde{a}_{ij}\}_{(i,j) \in E} \quad (10)$$

where $\tilde{\alpha}_i = \log \alpha_i$ and $\tilde{a}_{ij} = \log a_{ij}$.
Let M be the m×n matrix such as:

$$M_{ki} = \begin{cases} -1 & \text{if } i = u_k, \\ 1 & \text{if } i = v_k, \\ 0 & \text{else.} \end{cases} \quad (11)$$

System (10) can be rewritten as $M\tilde{\alpha} = \tilde{a}$. The rank of M is n−1. To make the solution unique and regularize the system, we can add the a priori that the gains are close to 1 (and their logarithm close to 0):

$$\hat{\tilde{\alpha}} = \underset{\tilde{\alpha}}{\operatorname{argmin}} \|M\tilde{\alpha} - \tilde{a}\|^2 + \lambda \|\tilde{\alpha}^*\|^2$$

As mentioned earlier, other advantageous embodiments of the invention may take into account the confidence we have in the relations (10). Depending on the goodness of fit measures provided by the regression estimation we can add more weight to relations in which there is a strong confidence. Let $g_{ij}$ the goodness of fit measure as defined for example per (8) for the regression of fibers i and j. It might he advantageous to use a continuous function w that evaluates to zero below a given goodness of fit threshold and then increase.

Let W be the diagonal weight matrix defined by $W_{kk}=w(g_{u_k,v_k})$. The weighted system is:

$$\hat{\alpha} = \underset{\alpha}{\operatorname{argmin}} \|W(M\tilde{\alpha} - \tilde{a})\|^2 + \lambda \|\tilde{\alpha}^*\|^2 \qquad (12)$$

System (12) can for example be solved with any direct sparse QR factorization algorithms or any iterative methods.

Offset Estimation

The linear system for offset estimation is:

$$\beta_j - \frac{\alpha_j}{\alpha_i}\beta_i = b_{ij} \qquad (13)$$

There are several ways to solve the system, including but not restricted to:

a. The factor $$\frac{\alpha_j}{\alpha_i}$$

can be approximated by $\alpha_{ij}$.

b. Using an estimation of $\alpha$ obtained according to the method presented in the previous section, the factor $$\frac{\alpha_j}{\alpha_i}$$

can be computed.

c. Using an estimation of $\alpha$ obtained according to the method presented in the previous section, one can estimate $b_{\tilde{ij}}$ using $v/\alpha_j \approx v/\alpha_i + b_{\tilde{ij}}$, then solve the linear system $\tilde{\beta}_j - \tilde{\beta}_i = b_{\tilde{ij}}$ and deduce $\beta_i = \alpha \tilde{\beta}_i$.

If an initial estimation of the offset is available, e.g. a background image acquired during the calibration of the imaging system, embodiments of the invention may use it to regularize the solution. For example, if the background is known to decrease according to a multiplicative law, the fiber background $\beta$ at time $t_i$ can be approximated from background $\beta^{(0)}$ at time $t_0$ by $q\beta^{(0)}$ where q is an unknown factor. Injecting $\beta_i = q\beta_i^{(0)}$ in (13), we obtain:

$$q\beta_j(0) - \frac{\alpha_j}{\alpha_i} q\beta_i(0) = b_{ij}$$

A robust estimate of q may for example be provided by:

$$\hat{q} = \operatorname{median}_{(i,j)\in E} \frac{b_{ij}}{\beta_j^{(0)} - \beta_i^{(0)} \cdot a_{ij}}$$

From this estimate, we may obtain an approximation $\hat{\beta}=ij\beta^{(0)}$ of $\beta$ and use this value as a regularization for the system (13). Weighting the system as described in a previous section, offset estimation may be rewritten as:

$$\hat{\beta} = \underset{\beta}{\operatorname{argmin}} \|W(A\cdot\beta - b)\|^2 + \lambda\|\beta - q\beta^{(0)}\|^2 \qquad (14)$$

where A is the m×n matrix defined in (11).

Equation (14) may then advantageously then solved with any of the methods described previously.

Deciding When to Launch the Estimation

In the context of affine fiber transfer function, we still need to decide when an estimation can be done. In this scenario, we disclose two criteria that may be advantageous to test. First, we might require that a small quantile of the correlation coefficients between neighboring fibers computed over the last p samples be above a given threshold. This will ensure that there will probably be a good affine relation between most of neighboring fiber returned signals.

Secondly, we might require that a given fraction of the fibers have at least a large number of samples within the temporal window whose returned signal is not simply the background (e.g. auto-fluorescence) of the fiber, but also accounts for object signal collected at the distal end of the fiber. To determine if a sample does not come only from the background of the fiber, embodiments of the invention might for example check whether its value is superior to the last estimated offset value for the fiber plus a factor of the estimated noise of the fiber, e.g. standard deviation, maximum absolute deviation and the like. Such a criterion may ensure that the range of values collected by the fibers is broad enough to make a reliable regression.

Furthermore we may compute the correlation coefficient between successive frames:

$$ncc(v(t_i), v(t_{i+1})) = \frac{\operatorname{Cov}(v(t_i), v(t_{i+1}))}{(\operatorname{Var}(v(t_i))\operatorname{Var}(v(t_{i+1})))^{1/2}}$$

If this coefficient is above a given threshold, then we may consider that there is no bundle-to-object motion. If many successive images have no bundle-to-object motion, we might keep only the first of these in the history. This filtering may be advantageous because almost identical successive frames do not necessarily make the regressions more accurate. They may, on the contrary, bias the regressions between fibers on either side of strong edges.

Quick Background Estimation

In the context of fluorescence imaging, the fiber auto-fluorescent background typically decreases over time, quickly at first if the fiber bundle has not been pre-illuminated and then more slowly. In the mechanism presented in the previous section, gains and offsets are estimated only when enough useful observed signal has been collected. There are two potential shortcomings with this approach. First, it potentially misses the opportunity to estimate background at the most favorable time, when almost no distal object signal is collected by the fiber bundle (This scenario typically arises when the fiber bundle needs to be in contact with the imaged object). Second, if the fiber bundle sees only high fluorescent object signals and never low object signals, then the regression intercept coefficients $b_{ij}$ will be inaccurate, and the resulting offsets as well. That is why, in this case, it might be advantageous not to attempt any background estimation.

In a preferred embodiment of the invention, an alternate quick background estimation might be done. This quick background estimation relies on the hypothesis made in a previous section, that the offsets $\beta(t)$ at time t can be well approximated by $q\beta(t_o)$, meaning that only one parameter, q, needs to be estimated to obtain a new background estimation.

We now disclose an algorithm to quickly update the background. It may operate as follows. For each frame, it identifies samples that are highly likely to measure background. The fibers for which such a criterion is met are marked. Frames are processed until a fixed fraction of the fibers has been marked. At this point, we may look for all values in the history buffer that are under the current offset and make an estimate of q from them. An example estimate is given by:

$$\hat{q}=\text{median}_{t_j \in history}\{v_i(t_j)/\beta_i^{(0)}|v_i(t_j)<\beta_i^{(0)}\} \quad (15)$$

Modes of Operation

Figure 2:
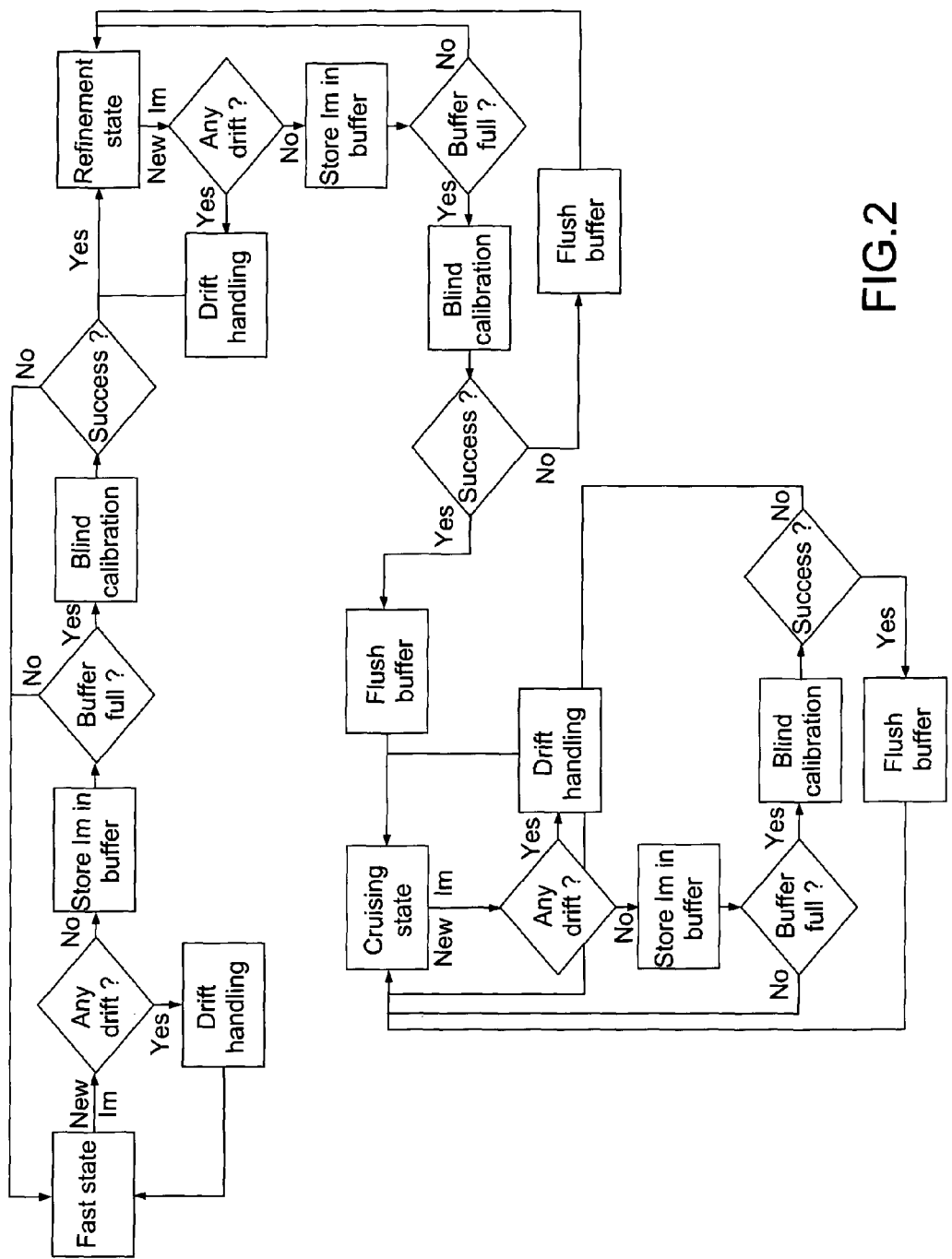
FIG. 2 is an example state diagram representing the transitions between potential modes of operations of the invention disclosed herein.

The calibration estimation as explained in the previous sections is essentially an on-line process, continuously accumulating frames and estimating a new calibration when enough information is available. Slightly different behaviors may however be desirable depending on the time. In FIG. 2, we present some potential means of customizing these behaviors depending on the history of the acquisition. At startup, a fast estimation, even if not very accurate, may be wanted. Once an initial estimation is provided, a slower but more accurate estimation could be performed. As a result, the on-line calibration may be modeled as a state chart. Each state may have different parameters for the estimation, the launch decision and the calibration coefficients estimation.

Figure 3:
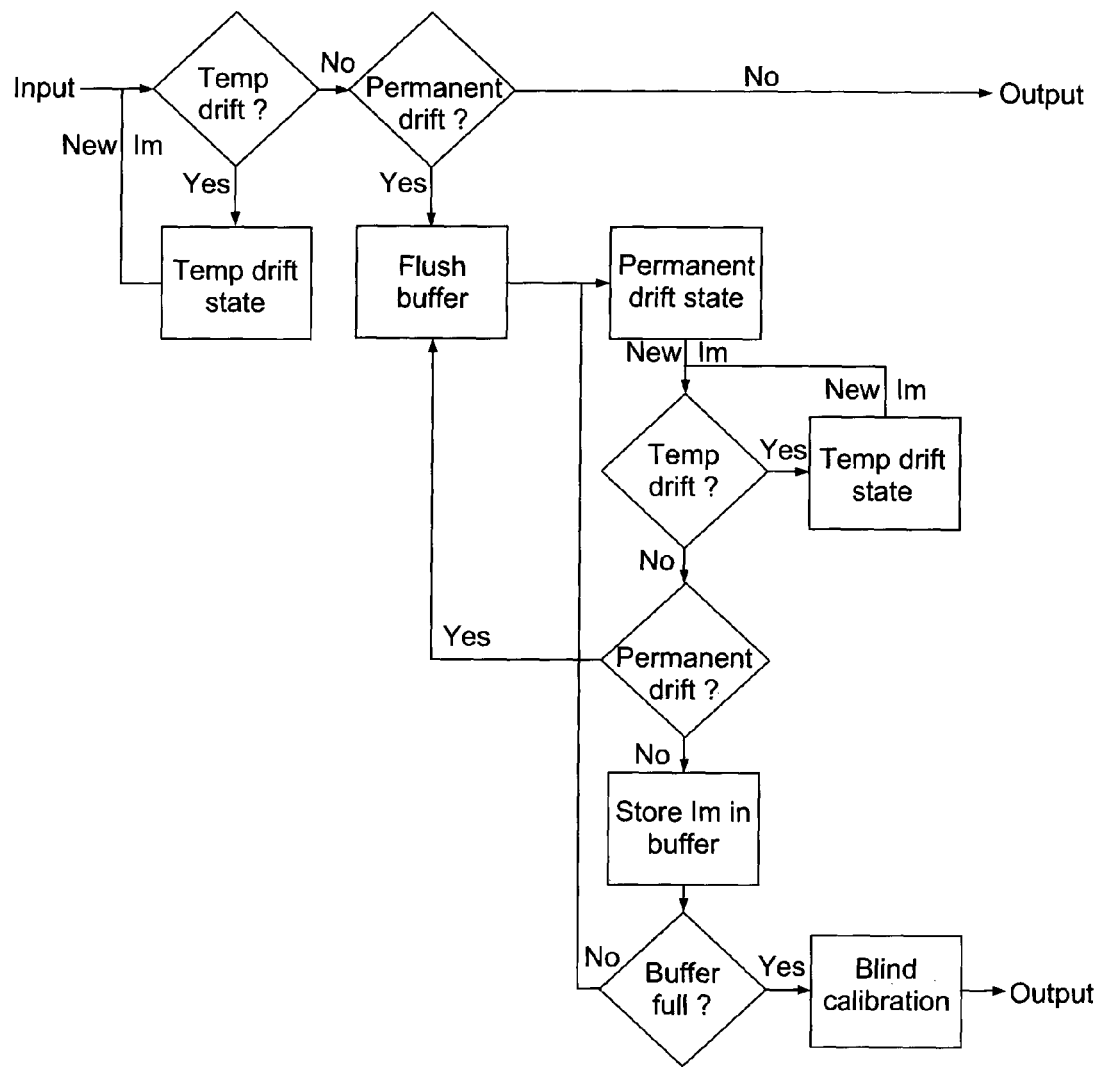
FIG. 3 depicts an example flow chart of the imaging system drift handling sub-component represented in FIG. 2.

In a preferred embodiment of the invention, five states, which are illustrated in FIG. 2, may be defined:

a. In the initial state, a fast estimation may be wanted and parameters may be set accordingly. It might be advantageous to only estimate gains since the offsets computed from the background image acquired during startup calibration should be still accurate. Of course, quick background estimation is possible. Once a gain estimation is successfully performed, the system may transit to the second state, without flushing its history buffer. The rationale is to keep the history buffer and accumulate more frames to refine the previous estimation. If an estimation is attempted but fails, the system may stay in this state without flushing the history buffer, but wait that more frames have been accumulated before attempting another estimation.

b. In the second state, parameters may be tuned to get an accurate estimation. Again, it might be advantageous to only estimate gains. Of course, quick background estimation is possible. Once a gain estimation is successfully performed, the system may transit to the third state and the history buffer may be flushed. If an estimation is attempted but fails, the system may stay in this state and the history buffer may be flushed.

c. The third state would be a cruising state. Compared to the second state, typically, only the history buffer size is increased. Gain and background estimation are enabled, as well as quick background estimation. Whether an estimation succeeds or fails, the system may stay in this state, but the history buffer may be flushed after each estimation (except potentially for quick background estimation).

d. The fourth state is a special state to which the system may transit when a permanent drift of the imaging system configuration is detected. In this case, computed gains may need to be re-estimated. It is quite similar to the first state since we may want a new gain estimation quickly. After an estimation is attempted, whether it succeeds or not, the system may transit back to the state it was before moving to this state. FIG. 3 presents a flowchart of the steps that may be taken when encountering such a permanent drift.

e. The fifth state is also a special state to which the system may transit when a temporary drift of the imaging system configuration is detected. In this case, the system may stay in this state until the drift is corrected and may transit back to the state it was before moving to this state afterward. FIG. 3 presents a flowchart of the steps that may be taken when encountering such a temporary drift.

While the foregoing written description of the invention enables one of ordinary skill to make and use what is considered presently to be the best modes thereof, those of ordinary skill will understand and appreciate the existence of variations, combinations, and equivalents of the specific embodiments, methods, and examples herein. The invention should therefore not be limited by the above described embodiments, methods, and examples, but by all embodiments and methods within the scope and spirit of the invention as disclosed.

What is claimed is:

1. A method for processing images acquired by an imaging system comprising image detectors with non-uniform transfer functions and irregular spatial locations, the method comprising:
   accumulating data from multiple images;
   defining an affinity graph which edges define pairs of detectors that measure related signal;
   performing statistical analysis on the accumulated data with respect to each pair of detectors; and
   solving a system of equations constructed from the results of the statistical analysis to estimate each detector transfer function, a set of solutions to the system of equations comprising a calibration of the imaging system.

2. The method according to claim 1, wherein, the statistical analysis comprises regressions.

3. The method according to claim 2, wherein calibration is performed as soon as a quantile of a correlation coefficient associated to regression on the accumulated data reaches a threshold.

4. The method according to claim 1, wherein a time-varying adaptive calibration is performed by changing a temporal window.

5. The method according to claim 2, wherein calibration is performed continuously as soon as a quantile of a correlation coefficient associated to regression on the accumulated data reaches a threshold.

6. The method according to claim 1, wherein the accumulated data is composed from successive images for which the correlation coefficient computed between said successive images reaches a threshold.

7. The method according to claim 5, wherein different parameters of the detector transfer functions are updated at different times depending on the content of the accumulated data.

8. The method according to claim 1, further comprising acquiring a background image during initialization of the calibration of the imaging system.

9. The method according to claim 1, wherein each calibration is saved and restored for ulterior initializations.

10. The method according to claim 1, wherein the affinity graph is constructed from a neighborhood information, in particular, based on the Delaunay triangulation of the spatial position of the detectors.

11. The method according to claim 1, further comprising using the calibration for image reconstruction.

12. The method according to claim 1, wherein the data is pre-processed or filtered prior to performing the statistical analysis on the linked detectors.

13. The method according to claim 1, wherein computations associated with solving the system of equations are stabilized by using prior information, goodness of fit measures from regressions, or robust computation methods.

14. The method according to claim 4, wherein computations associated with solving the system of equations are stabilized by using prior information on temporal evolution or temporal smoothness constraints.

15. The method according to claim 8, wherein a model of a temporal background evolution is used to update an initial estimation of the background image.

16. The method according to claim 1, wherein the calibration is computed off-line or in lagged time.

17. The method according to claim 16, wherein, several different sequences of images are combined to compute the calibration.

* * * * *